US011181047B2

(12) United States Patent
Kishi et al.

(10) Patent No.: US 11,181,047 B2
(45) Date of Patent: Nov. 23, 2021

(54) FUEL SUPPLY SYSTEM, GAS TURBINE, ELECTRICITY GENERATION PLANT, CONTROL METHOD, AND PROGRAM

(71) Applicant: Mitsubishi Hitachi Power Systems, Ltd., Kanagawa (JP)

(72) Inventors: Makoto Kishi, Tokyo (JP); Keisuke Yamamoto, Tokyo (JP); Hiroyuki Nakagawa, Yokohama (JP); Hisashi Nakahara, Yokohama (JP); Shinya Uchida, Yokohama (JP); Ryo Koto, Kanagawa (JP)

(73) Assignee: Mitsubishi Power, Ltd., Kanagawa (JP)

( * ) Notice: Subject to any disclaimer, the term of this patent is extended or adjusted under 35 U.S.C. 154(b) by 0 days.

(21) Appl. No.: 16/772,972

(22) PCT Filed: Nov. 27, 2018

(86) PCT No.: PCT/JP2018/043574
§ 371 (c)(1),
(2) Date: Jun. 15, 2020

(87) PCT Pub. No.: WO2019/138709
PCT Pub. Date: Jul. 18, 2019

(65) Prior Publication Data
US 2021/0172385 A1 Jun. 10, 2021

(30) Foreign Application Priority Data

Jan. 12, 2018 (JP) .............................. JP2018-003422

(51) Int. Cl.
*F02C 9/28* (2006.01)
*F02C 7/232* (2006.01)
*F02C 7/224* (2006.01)

(52) U.S. Cl.
CPC ............... *F02C 9/28* (2013.01); *F02C 7/232* (2013.01); *F02C 7/224* (2013.01);
(Continued)

(58) Field of Classification Search
CPC .. F02C 7/224; F02C 7/232; F02C 9/28; F02C 9/46; F05D 2220/76; F05D 2240/35; F05D 2270/301; F05D 2270/303
See application file for complete search history.

(56) References Cited

U.S. PATENT DOCUMENTS

| 5,680,753 A | 10/1997 | Hollinger et al. |
| 7,565,792 B2 * | 7/2009 | Tanaka .................... F02C 7/185 |
| | | 60/39.281 |

(Continued)

FOREIGN PATENT DOCUMENTS

| JP | 8-61095 | 3/1996 |
| JP | 10306708 | 11/1998 |

(Continued)

OTHER PUBLICATIONS

International Search Report dated Feb. 19, 2019 in International (PCT) Application No. PCT/JP2018/043574, with English translation.

(Continued)

*Primary Examiner* — Jesse S Bogue
(74) *Attorney, Agent, or Firm* — Wenderoth, Lind & Ponack, L.L.P.

(57) ABSTRACT

A gas turbine fuel supply system includes a fuel supply flow passage that includes a fuel gas heater which heats fuel and supplies the fuel heated by the fuel gas heater to a first nozzle and a second nozzle, a bypass flow passage that supplies the fuel to the first nozzle without passing through the fuel (Continued)

supply flow passage, and a bypass fuel flow rate adjusting valve that adjusts a flow rate of the fuel flowing in the bypass flow passage.

17 Claims, 11 Drawing Sheets

(52) U.S. Cl.
CPC ...... *F05D 2220/76* (2013.01); *F05D 2240/35* (2013.01); *F05D 2270/301* (2013.01); *F05D 2270/303* (2013.01)

(56) References Cited

U.S. PATENT DOCUMENTS

| | | | | |
|---|---|---|---|---|
| 7,610,745 | B2* | 11/2009 | Fujii | F02C 9/28 60/39.27 |
| 8,572,975 | B2* | 11/2013 | Bilton | F02C 7/224 60/736 |
| 9,759,130 | B2* | 9/2017 | Appukuttan | F02C 7/141 |
| 2010/0307157 | A1* | 12/2010 | Bilton | F02C 6/18 60/730 |
| 2010/0307158 | A1 | 12/2010 | Bilton et al. | |
| 2013/0247578 | A1 | 9/2013 | Deuker et al. | |
| 2014/0090395 | A1* | 4/2014 | Appukuttan | F02C 7/224 60/776 |
| 2014/0230449 | A1 | 8/2014 | Saito et al. | |
| 2014/0238041 | A1 | 8/2014 | Crothers et al. | |

FOREIGN PATENT DOCUMENTS

| | | |
|---|---|---|
| JP | 11-270850 | 10/1999 |
| JP | 2000-213374 | 8/2000 |
| JP | 2010-281325 | 12/2010 |
| JP | 2012-184735 | 9/2012 |
| JP | 2013-113201 | 6/2013 |
| JP | 2013-117752 | 6/2013 |
| JP | 2013-185454 | 9/2013 |
| JP | 2013-545022 | 12/2013 |
| JP | 2014-163300 | 9/2014 |
| JP | 2014-163390 | 9/2014 |
| WO | 2015/124909 | 8/2015 |

OTHER PUBLICATIONS

Written Opinion of the International Searching Authority dated Feb. 19, 2019 in International (PCT) Application No. PCT/JP2018/043574, with English translation.

* cited by examiner

FUEL SUPPLY SYSTEM, GAS TURBINE, ELECTRICITY GENERATION PLANT, CONTROL METHOD, AND PROGRAM

TECHNICAL FIELD

The present invention relates to a fuel supply system, a gas turbine, a power generation plant, a control method, and a program.

Priority is claimed on Japanese Patent Application No. 2018-003422, filed Jan. 12, 2018, the content of which is incorporated herein by reference.

BACKGROUND ART

A gas turbine combined cycle (GTCC) power plant that generates electric power by operating a gas turbine and operating a steam turbine using steam which is generated using waste heat discharged from the gas turbine has been provided. When an emergency occurs during operation of such a power plant, an operation which is called load rejection in which a load is shut off and operation is continued may be performed. When a load is shut off, a rotation speed of the gas turbine increases. At this time, in order to prevent an excessive increase in the rotation speed, control for rapidly decreasing an amount of fuel which is supplied to a combustor and curbing the rotation speed to be equal to or less than a predetermined threshold value may be performed. The gas turbine may include a plurality of fuel supply systems having different functions. In such a gas turbine including a plurality of fuel supply systems, even when an amount of supplied fuel is rapidly decreased at the time of load rejection, control for increasing an amount of fuel supplied to a pilot system that supplies flames serving as pilot flames may be performed to prevent a misfire in the combustor.

In the related art, Patent Literature 1 describes a control method of increasing an amount of fuel supplied to a pilot system by providing a fuel storage upstream from a valve that adjusts an amount of fuel supplied to a pilot system, storing fuel gas in the fuel storage in advance, and supplying fuel from the fuel storage at the time of starting of a gas turbine or at the time of load rejection.

CITATION LIST

Patent Literature

[Patent Literature 1]
Published Japanese Translation No. 2013-545022 of the PCT International Publication

SUMMARY OF INVENTION

Technical Problem

Recently, a supply pressure of fuel which is supplied to a combustor has been limited to a low pressure according to a request for a decrease in cost or the like. When load rejection occurs in such equipment, there is a likelihood that an amount of fuel sufficient for maintaining flames will not be supplied because an original supply pressure of fuel is not sufficient even when it is intended to increase an amount of fuel supplied to a pilot system.

The invention provides a fuel supply system, a gas turbine, a power generation plant, a control method, and a program that can solve the above-mentioned problem.

Solution to Problem

According to an aspect of the invention, there is provided a fuel supply system including: a fuel supply flow passage that includes a fuel gas heater which heats fuel of a gas turbine and supplies the fuel heated by the fuel gas heater to a first nozzle and a second nozzle; a bypass flow passage that supplies the fuel to the first nozzle without passing through the fuel supply flow passage; and a bypass fuel flow rate adjusting valve that adjusts a flow rate of the fuel flowing in the bypass flow passage.

In the fuel supply system according to the aspect of the invention, a density of the fuel which is supplied to the first nozzle via the bypass flow passage may be higher than a density of the fuel which is supplied to the first nozzle via the fuel supply flow passage.

In the fuel supply system according to the aspect of the invention, a pressure loss in the bypass flow passage may be less than a pressure loss in the fuel supply flow passage.

The fuel supply system according to the aspect of the invention may further include a discharge flow passage of drainage that connects the bypass flow passage and the fuel supply flow passage.

In the fuel supply system according to the aspect of the invention, the bypass fuel flow rate adjusting valve may be provided between a connection position of the discharge flow passage in the bypass flow passage and a manifold to which the first nozzle is connected.

In the fuel supply system according to the aspect of the invention, the bypass fuel flow rate adjusting valve may be provided at a position which is closer to the manifold than the connection position of the discharge flow passage.

In the fuel supply system according to the aspect of the invention, when a piping distance between the bypass fuel flow rate adjusting valve and a manifold to which the first nozzle is connected is defined as a first distance and a piping distance between a first fuel flow rate adjusting valve that is disposed in the fuel supply flow passage and adjusts a flow rate of the fuel supplied to the first nozzle and the manifold is defined as a second distance, the bypass fuel flow rate adjusting valve may be provided at a position at which the first distance is equal to or less than the second distance.

The fuel supply system according to the aspect of the invention may further include a control device that adjusts an opening of the bypass fuel flow rate adjusting valve.

In the fuel supply system according to the aspect of the invention, a first fuel flow rate adjusting valve that adjusts a flow rate of the fuel supplied to the first nozzle may be provided in the fuel supply flow passage, and the control device may open the first fuel flow rate adjusting valve and the bypass fuel flow rate adjusting valve at the time of the decrease in load with an opening greater than that before a decrease in load of the gas turbine.

In the fuel supply system according to the aspect of the invention, the control device may perform control for fully opening the first fuel flow rate adjusting valve for a predetermined time at the time of the decrease in load and opening the bypass fuel flow rate adjusting valve, which is in a closed state before the decrease in load, with a predetermined opening at the time of the decrease in load.

In the fuel supply system according to the aspect of the invention, the control device may control the opening of the bypass fuel flow rate adjusting valve after the decrease in load on the basis of a change index of a fuel flow rate which is determined according to an elapsed time after the decrease in load.

In the fuel supply system according to the aspect of the invention, the control device may learn a coefficient for adjusting the opening of the bypass fuel flow rate adjusting valve on the basis of a fuel-air ratio of the first nozzle and a fuel-air ratio of the second nozzle at the time of the decrease in load and information indicating a relationship between the fuel-air ratio of the first nozzle and the fuel-air ratio of the second nozzle at which a misfire occurs.

In the fuel supply system according to the aspect of the invention, the control device may correct the opening of the bypass fuel flow rate adjusting valve on the basis of an environmental condition indicating a state of air which is suctioned into the gas turbine.

In the fuel supply system according to the aspect of the invention, the control device may correct the opening of the bypass fuel flow rate adjusting valve on the basis of a fuel condition indicating a feature of the fuel.

According to another aspect of the invention, a fuel supply system is provided including: a fuel supply flow passage that supplies fuel to a first nozzle and a second nozzle at the time of a normal load operation of a gas turbine; a bypass flow passage that supplies the fuel to the first nozzle without passing through the fuel supply flow passage; and a bypass fuel flow rate adjusting valve that adjusts a flow rate of the fuel flowing in the bypass flow passage, wherein the bypass fuel flow rate adjusting valve is closed at the time of the normal load operation and the bypass fuel flow rate adjusting valve is open when the load is lower than that at the time of the normal load operation.

According to another aspect of the invention, there is provided a gas turbine including: a compressor; a combustor; a turbine; and the above-mentioned fuel supply system.

According to another aspect of the invention, a power generation plant is provided including: the above-mentioned gas turbine; a steam turbine; and a power generator.

According to another aspect of the invention, there is provided a control method for a fuel supply system including a fuel supply flow passage that includes a fuel gas heater which heats fuel of a gas turbine and supplies the fuel heated by the fuel gas heater to a first nozzle and a second nozzle, a bypass flow passage that supplies the fuel to the first nozzle without passing through the fuel supply flow passage, and a bypass fuel flow rate adjusting valve that adjusts a flow rate of the fuel flowing in the bypass flow passage, wherein the bypass fuel flow rate adjusting valve is controlled from a closed state to an open state at the time of a decrease in load of the gas turbine.

According to another aspect of the invention, a program is provided causing a computer of a control device for a fuel supply system, which includes a fuel supply flow passage that includes a fuel gas heater which heats fuel of a gas turbine and supplies the fuel heated by the fuel gas heater to a first nozzle and a second nozzle, a bypass flow passage that supplies the fuel to the first nozzle without passing through the fuel supply flow passage, and a bypass fuel flow rate adjusting valve that adjusts a flow rate of the fuel flowing in the bypass flow passage, to serve as a means that controls the bypass fuel flow rate adjusting valve from a closed state to an open state at the time of a decrease in load of the gas turbine.

Advantageous Effects of Invention

With the fuel supply system, the gas turbine, the power generation plant, the control method, and the program which are described above, it is possible to secure a necessary amount of supplied fuel and to prevent a misfire even when an amount of supplied fuel is decreased in rapidly decreasing a load of the gas turbine.

DESCRIPTION OF EMBODIMENTS

First Embodiment

Hereinafter, a control method at the time of load rejection according to a first embodiment of the invention will be described with reference to FIGS. 1 to 10.

Figure 1:
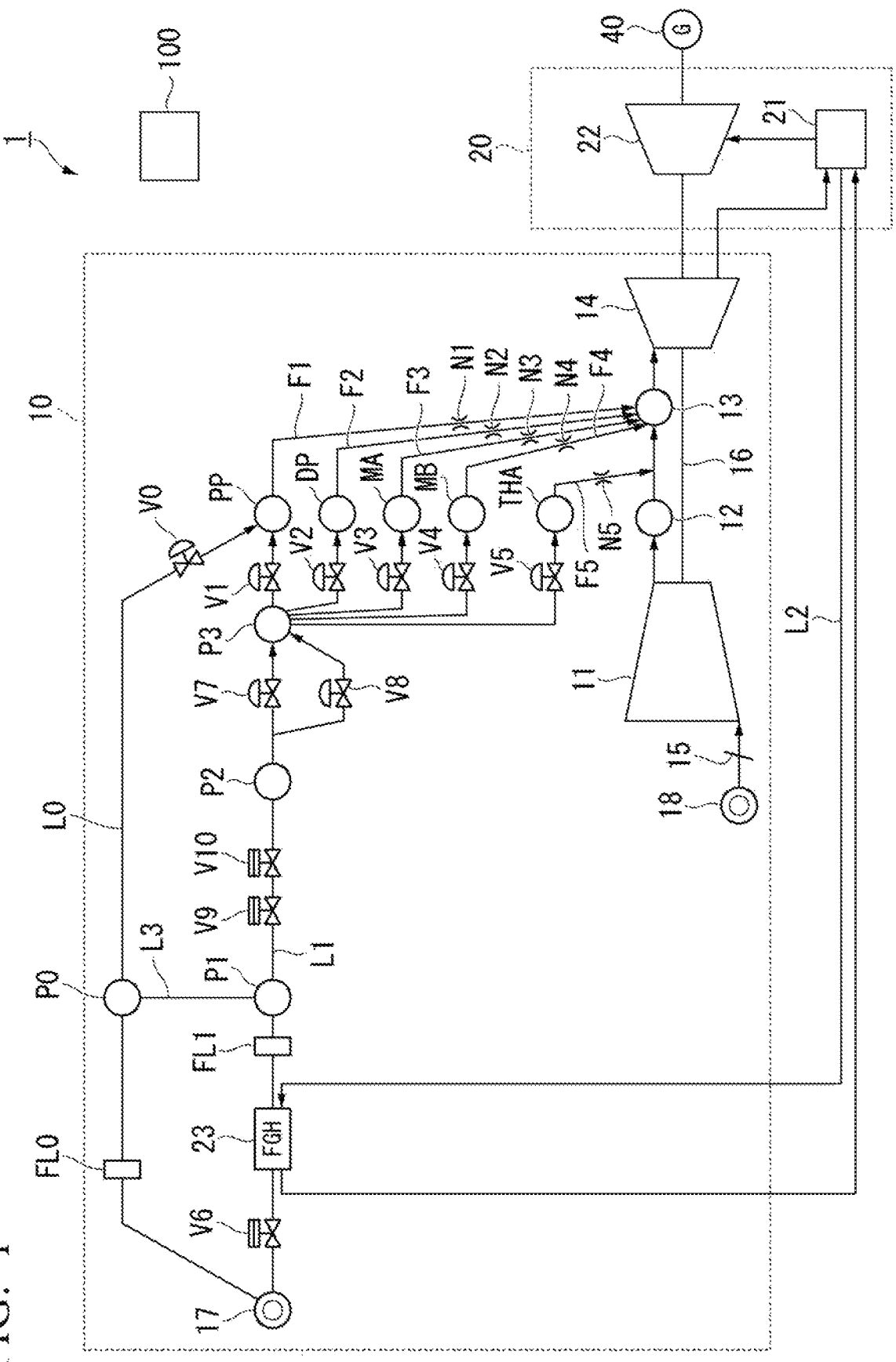
FIG. 1 is a system diagram of a combined cycle power plant according to a first embodiment of the invention.

FIG. 1 is a system diagram illustrating a combined cycle power plant according to the first embodiment of the invention.

As illustrated in FIG. 1, the gas turbine combined cycle power plant 1 (hereinafter referred to as a power generation plant 1) according to this embodiment includes a gas turbine 10, a steam turbine 20, a power generator 40 that is provided to be connected to a rotor 16 of the gas turbine 10 and the steam turbine 20, and a control device 100 that controls the power generation plant 1.

The gas turbine 10 includes an inlet guide vane (IGV) 15 that adjusts an amount of air flowing from an air inlet system 18, a compressor 11 that compresses air to generate compressed air, a compartment 12 to which the compressed air flows, a combustor 13 that mixes fuel gas into the compressed air and combusts the mixed gas to generate combustion gas of a high temperature, a turbine 14 that rotationally drives a rotor 16 using the combustion gas, a fuel tank P3, a plurality of fuel systems F1 to F5, a fuel line L1 that supplies fuel to the fuel systems F1 to F5, and a fuel line L0 that supplies fuel to the fuel system F1. A shutoff valve V6, a filter FL1, a drain inlet P1, a shutoff valve outlet P2, a fuel gas heater (FGH) 23, a pressure regulating valve V7 and a pressure regulating valve V8 that control a fuel supply pressure which is supplied by a pressure supply system 17, a safety valve V9, and safety valve V10 are provided in the fuel line L1.

The plurality of fuel systems F1 to F5 include a premixing pilot system F1, a diffusing pilot system F2, a main A system F3, a main B system F4, and a top hat system F5. The premixing pilot system F1 includes a fuel flow rate adjusting valve V1 that adjusts an amount of fuel supplied from the fuel tank P3, a premixing pilot manifold PP, and a fuel nozzle N1 that is connected to the premixing pilot manifold PP. The diffusing pilot system F2 includes a fuel flow rate adjusting valve V2 that adjusts an amount of fuel supplied from the fuel tank P3, a diffusing pilot manifold DP, and a fuel nozzle N2 that is connected to the diffusing pilot manifold DP. The main A system F3 includes a fuel flow rate adjusting valve V3 that adjusts an amount of fuel supplied from the fuel tank P3, a main A manifold MA, and a fuel nozzle N3 that is connected to the main A manifold MA. The main B system F4 includes a fuel flow rate adjusting valve V4 that adjusts an amount of fuel supplied from the fuel tank P3, a main B manifold MB, and a fuel nozzle N4 that is connected to the main B manifold MB. The top hat system F5 includes a fuel flow rate adjusting valve V5 that adjusts an amount of fuel supplied from the fuel tank P3, a top hat manifold THA, and a fuel nozzle N5 that is connected to the top hap manifold THA.

The premixing pilot system F1 performs premixing combustion to achieve a decrease of NOx of the combustor 13. The diffusing pilot system F2 performs diffusing combustion to achieve flame stabilization. The main A system F3 and the main B system F4 are main fuel systems that supply premixed gas based on the magnitude of the load of the gas turbine 10. The top hat system F5 sprays fuel gas from an upstream side of the combustor 13 (the compartment 12 side) to achieve improvement in combustion efficiency or flame stabilization. The control device 100 controls amounts of fuel supplied from the plurality of fuel systems F1 to F5 on the basis of the load or the operating state of the gas turbine 10.

A filter FL0, a drain outlet P0, and a fuel flow rate adjusting valve V0 that adjusts an amount of fuel supplied to the premixing pilot manifold PP are provided in the fuel line L0. The fuel line L0 is a characteristic configuration of the gas turbine 10 according to this embodiment, and since the fuel line L0 bypasses the fuel gas heater 23, the valves, and the like, fuel passing through the fuel line L0 has a lower pressure loss than fuel passing through the fuel line L1. The fuel passing through the fuel line L0 is not heated by the fuel gas heater 23 and thus has a lower temperature and a higher density than the fuel supplied via the fuel line L1. That is, the premixing pilot manifold PP is supplied with fuel of two systems, that is, the fuel which passes through the fuel line L0 and of which a flow rate is adjusted by the fuel flow rate adjusting valve V0 and the fuel which passes through the fuel line L1 and of which a flow rate is adjusted by the fuel flow rate adjusting valve V1, and the fuel supplied from the fuel line L0 side has a lower temperature, a higher density, and a higher pressure than the fuel supplied from the fuel line L1 side. Since the fuel supplied from the fuel line L0 side has a higher density and a higher pressure, a larger amount of fuel can be supplied from the fuel line L0 side than from the fuel line L1 side.

A line L3 that connects the drain outlet P0 and the drain inlet P1 serves to discharge drainage to the fuel line L1 to prevent fuel from gathering in the fuel line L0. A flow rate of the fuel supplied to the fuel line L1 via the line L3 is limited to a low rate.

The fuel flow rate adjusting valve V0 is provided at a position between the drain outlet P0 and the premixing pilot manifold PP and is preferably provided at a position which is as close to the premixing pilot manifold PP as possible. The fuel flow rate adjusting valve V0 may be provided, for example, at a position closer to the premixing pilot manifold PP than to the drain outlet P0. When a piping distance between the fuel flow rate adjusting valve V0 and the premixing pilot manifold PP is defined as a first distance and a piping distance between the fuel flow rate adjusting valve V1 and the premixing pilot manifold PP is defined as a second distance, the fuel flow rate adjusting valve V0 may be provided at a position at which the first distance and the second distance are the same or a position at which the first distance is less than the second distance. The reason why the fuel flow rate adjusting valve V0 is preferably provided at a position close to the premixing pilot manifold PP is that fuel can be rapidly supplied after the fuel flow rate adjusting valve V0 is opened.

An exhaust port of the turbine 14 is connected to a heat recovery steam generator 21 of the steam turbine 20.

The steam turbine 20 generates steam from the heat recovery steam generator 21 using waste heat discharged from the turbine 14 and rotationally drives the turbine 22 with the steam.

The heat recovery steam generator 21 and the fuel gas heater 23 are connected to each other via a heated water supply line L2. The fuel gas heater 23 increases the temperature of fuel which is equal to or lower than 100 degrees to several hundred degrees to enhance heat efficiency in the combustor 13. The fuel gas heater 23 is supplied with heated water from the heat recovery steam generator 21 via the heated water supply line L2. In the fuel gas heater 23, the heated water and the fuel flowing in the fuel line L1 exchange heat with each other. At this time, heat moves from the heated water to the fuel and the temperature of the fuel increases. Downstream from the fuel gas heater 23 (downstream in a direction in which fuel flows), a temperature sensor which is not illustrated is provided, and the control device 100 controls the temperature of fuel which is measured by the temperature sensor such that it reaches a desired temperature. The temperature sensor is provided downstream from the drain inlet P1 and the temperature of the fuel including fuel flow flowing from the line L3 is controlled.

Specifically, in the fuel gas heater 23, a heat exchanger (not illustrated) in which the heated water and the fuel exchange heat and a bypass flow passage of fuel that bypasses the heat exchanger are provided. The control device 100 controls the temperature of fuel such that it is in a predetermined range by switching a flow passage of the fuel between the bypass flow passage and the heat exchanger side. The fuel line L0 which is specific to this embodiment is a flow passage which bypasses the whole fuel line L1 (the fuel gas heater 23 and various valves) and is connected to the premixing pilot manifold PP unlike the bypass flow passage of the heat exchanger provided in the fuel gas heater 23. Fuel flowing in the fuel line L0 is not affected by temperature control using the fuel gas heater 23 and is not heated to a high temperature. Accordingly, a density of the fuel flowing in the fuel line L0 is higher than the density of the fuel gas flowing in the fuel line L1.

An example of normal fuel supply control at the time of load rejection will be described below with reference to FIGS. 2 to 4 along with FIG. 1. A general gas turbine does not include the fuel line L0.

Figure 2:
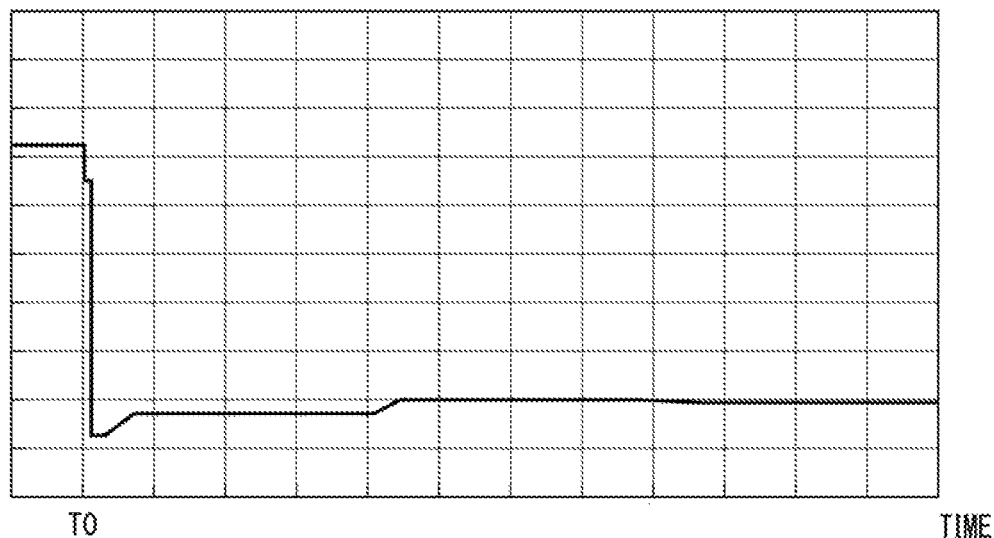
FIG. 2 is a first diagram illustrating a normal fuel supply control method at the time of load rejection.

FIG. 2 is a first diagram illustrating a normal fuel supply control method at the time of load rejection.

FIG. 2 is a graph illustrating an example of a change of a total fuel flow rate command value (a control signal output (CSO)) with the elapse of time after load rejection. When load rejection occurs at time TO as illustrated in the drawing, the control device 100 instantaneously decreases the value of the CSO to curb an increase in the rotation speed of the gas turbine 10. Thereafter, the control device 100 adjusts the CSO such that the rotation speed reaches a predetermined target value (for example, the same rotation speed as at the time of rated operation).

Figure 3:
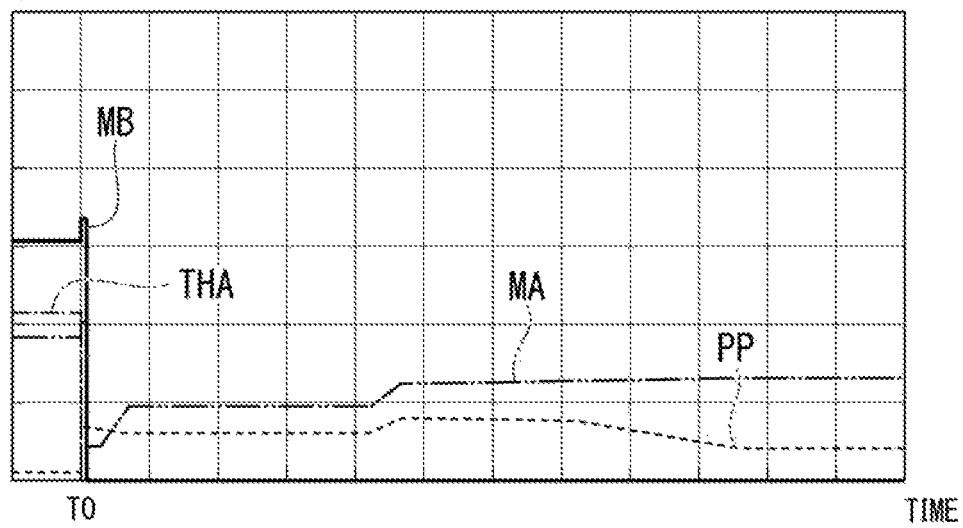
FIG. 3 is a second diagram illustrating a normal fuel supply control method at the time of load rejection.

FIG. 3 is a second diagram illustrating a normal fuel supply control method at the time of load rejection.

An example of details of the CSO illustrated in FIG. 2 is illustrated in FIG. 3. A graph MA indicates a proportion of fuel which is supplied to the main A system F3. A graph MB indicates a proportion of fuel which is supplied to the main B system F4. A graph PP indicates a proportion of fuel which is supplied to the premixing pilot system F1. A graph THA indicates a proportion of fuel which is supplied to the top hat system F5. The diffusing pilot system F2 is used at the time of starting or the like and is not supplied with fuel during operation. When load rejection occurs at time TO as illustrated in the drawing, the control device 100 fully closes the fuel flow rate adjusting valve V4 of the main B system F4 and the fuel flow rate adjusting valve V5 of the top hat system F5. The control device 100 decreases the opening of the fuel flow rate adjusting valve V3 of the main A system F3 (the graph MA) and fully opens the fuel flow rate adjusting valve V1 of the premixing pilot system F1 (the graph PP). Accordingly, an amount of fuel supplied to the combustor 13 is decreased to curb the rotation speed thereof, an amount of fuel supplied to the premixing pilot system F1 is increased, and pilot flames of the combustor 13 are maintained.

Relationships among a fuel-air ratio of the main A system F3, a fuel-air ratio of the premixing pilot system F1, and a misfire will be described below.

Figure 4:
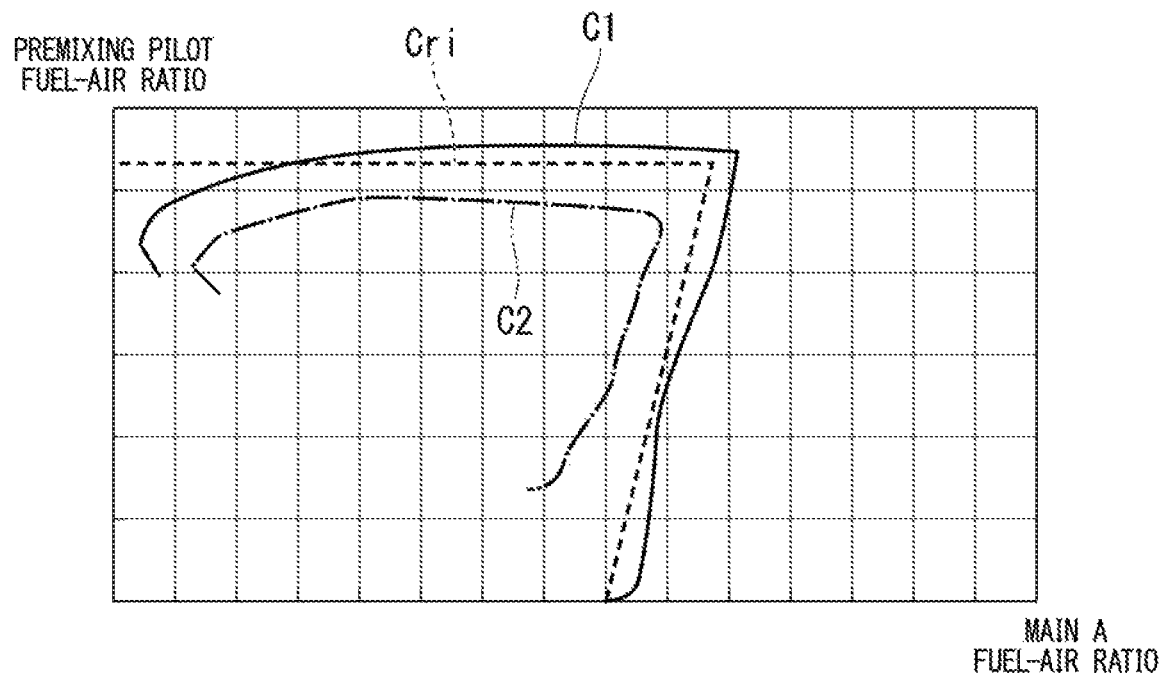
FIG. 4 is a third diagram illustrating a normal fuel supply control method at the time of load rejection.

FIG. 4 is a third diagram illustrating a normal fuel supply control method at the time of load rejection.

A graph C1 and a graph C2 in FIG. 4 indicate a relationship between a fuel-air ratio of fuel gas which is sprayed from the fuel nozzle N1 of the premixing pilot system F1 (a premixing pilot fuel-air ratio) and a fuel-air ratio of fuel gas which is sprayed from the fuel nozzle N3 of the main A system F3 (a main A fuel-air ratio) after load rejection.

A graph Cri indicates a value serving as a threshold value for determining whether flames in the premixing pilot system F1 will misfire (a fuel-air ratio criterion). When the premixing pilot fuel-air ratio becomes equal to or greater than the fuel-air ratio criterion at least at any one point, it is possible to prevent a misfire in the fuel nozzle N1.

When load rejection occurs as described above, control of curbing the output of the gas turbine 10 and achieving flame stabilization of the combustor 13 is performed by setting an amount of fuel supplied from the main B system F4, the diffusing pilot system F2, and the top hat system F5 to zero, decreasing an amount of fuel which is supplied from the main A system F3, and increasing an amount of fuel which is supplied from the premixing pilot system F1.

The graph C1 indicates a state in which the premixing pilot fuel-air ratio increases and reaches the fuel-air ratio criterion after load rejection. When the fuel-air ratio indicated by the graph C1 can be realized in two systems through which supply of fuel is continued after load rejection, it is possible to prevent a misfire. On the other hand, when an amount of fuel which is supplied from the fuel nozzle N1 of the premixing pilot system F1 is not sufficient and the relationship between the fuel-air ratios in the two fuel systems after load rejection reaches the relationship indicated by the graph C2, the value of the premixing pilot fuel-air ratio of the graph C2 becomes equal to or less than the fuel-air ratio criterion (the graph Cri) and thus the likelihood that a misfire will occur in the fuel nozzle N1 increases. When a misfire occurs, operation after load rejection cannot be realized. Whether a misfire occurs during operation can be determined, for example, on the basis of a flame detector, an exhaust gas temperature, a blade path temperature, or the like, and valve openings of the fuel flow rate adjusting valve V1 and the fuel flow rate adjusting valve V3 are calculated from the relationship between the premixing pilot fuel-air ratio and the main A fuel-air ratio in which the fuel-air ratio criterion illustrated in FIG. 4 is satisfied in pre-review. The control device 100 controls the fuel flow rate adjusting valve V1 and the fuel flow rate adjusting valve V3 on the basis of the valve openings which are calculated as described above.

For example, in equipment in which a fuel supply pressure of the pressure supply system 17 is not sufficient, even when the openings of the fuel flow rate adjusting valve V1 and fuel flow rate adjusting valve V3 after load rejection are controlled on the basis of the valve openings calculated as described above, there is a likelihood that an amount of fuel which is supplied from the fuel nozzle N1 will not be sufficient and the premixing pilot fuel-air ratio will not reach the fuel-air ratio criterion.

On the other hand, in this embodiment, the fuel line L0 for supplying a sufficient amount of fuel to the premixing pilot system F1 after load rejection is provided independently of the fuel line L1. The control device 100 closes the fuel flow rate adjusting valve V0 at the time of normal load operation (for example, when the load ranges from 40% to 100%) and does not supply fuel via the fuel line L0. On the other hand, when load rejection occurs, the fuel flow rate adjusting valve V0 of the fuel line L0 is opened in addition to control for fully opening the fuel flow rate adjusting valve V1 of the fuel line L1.

Then, fuel of a high density with a relatively high supply pressure maintained is supplied to the premixing pilot system F1 via the fuel line L0 in which a pressure loss is less than that in the fuel line L1. Accordingly, even in equipment in which the fuel supply pressure of the pressure supply system 17 is low, it is possible to secure an amount of fuel which is supplied to the premixing pilot system F1 and to avoid a misfire.

The control device 100 adjusts the opening of the fuel flow rate adjusting valve V0 even after load rejection in order to realize the amount of fuel at which the relationship between the premixing pilot fuel-air ratio and the main A fuel-air ratio reaches the relationship indicated by the graph C1 in FIG. 4.

FIG. 4 illustrates the graph indicating a relationship between an index of the premixing pilot fuel-air ratio and an index of the main A fuel-air ratio. The graph illustrated in FIG. 4 can be similarly expressed as a relationship between a calculated value of a flame temperature of the premixing pilot system F1 and a calculated value of a flame temperature of the main A system F3.

Load rejection control of the control device 100 will be described below.

Figure 5:
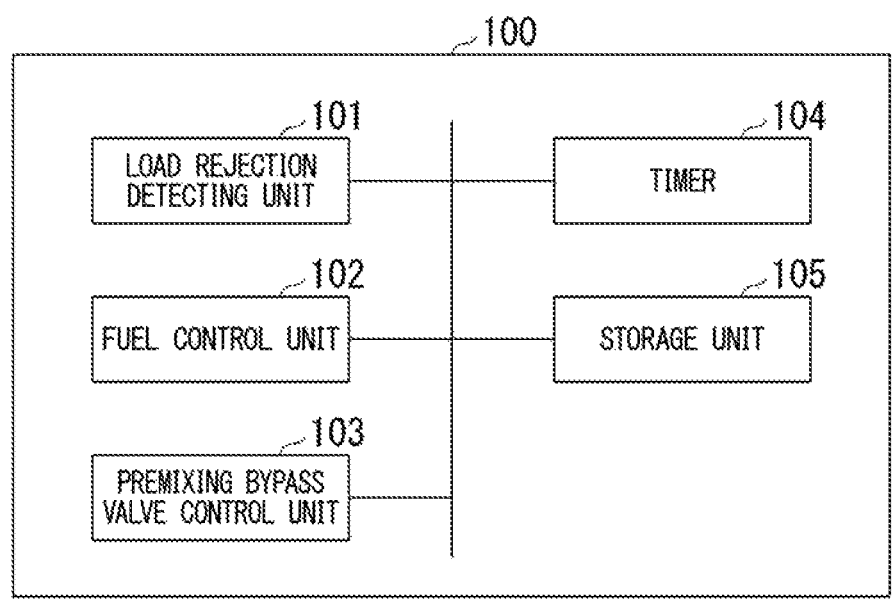
FIG. 5 is a block diagram illustrating an example of a control device according to the first embodiment of the invention.

FIG. 5 is a block diagram illustrating an example of the control device according to the first embodiment of the invention.

As illustrated in the drawing, the control device 100 includes a load rejection detecting unit 101, a fuel control unit 102, a premixing bypass valve control unit 103, a timer 104, and a storage unit 105.

The load rejection detecting unit 101 detects load rejection. For example, the load rejection detecting unit 101 acquires a load rejection signal indicating that a load has been shut off during operation of the gas turbine 10.

The fuel control unit 102 controls an amount of supplied fuel which is sprayed from the fuel nozzles N1 to N5 via the fuel line L1. For example, when the load rejection detecting unit 101 detects load rejection, the fuel control unit 102 performs control such that the rotation speed of the gas turbine 10 becomes equal to or less than a predetermined threshold value and the amount of supplied fuel sprayed from the fuel nozzles N1 to N5 becomes equal to or less than a predetermined amount of supplied fuel. For example, when load rejection occurs, the fuel control unit 102 performs control for fully closing the fuel flow rate adjusting valves V2, V4, and V5, decreasing the opening of the fuel flow rate adjusting valve V3 in comparison with that at the time of normal load operation, and fully opening the fuel flow rate adjusting valve V1 for a predetermined time.

The premixing bypass valve control unit 103 controls the fuel flow rate adjusting valve V0 of the fuel line L0. Specifically, the premixing bypass valve control unit 103 fully closes the fuel flow rate adjusting valve V0 at the time of a normal load operation. When the load rejection detecting unit 101 detects load rejection, the premixing bypass valve control unit 103 controls the fuel flow rate adjusting valve V0 from a closed state to an open state and adjusts the opening of the fuel flow rate adjusting valve V0 such that the fuel-air ratio of premixed fuel gas from the fuel nozzle N1 in the combustor 13 becomes equal to or greater than a predetermined fuel-air ratio (a fuel-air ratio criterion) at which occurrence of a misfire can be avoided.

The timer 104 measures time.

The storage unit 105 stores various types of information such as functions which are required for calculating the openings of the fuel flow rate adjusting valves V0 to V5 after load rejection.

The control device 100 has various functions associated with control of the gas turbine 10 and the steam turbine 20 and description of functions which are not associated with this embodiment will be omitted.

Figure 6:
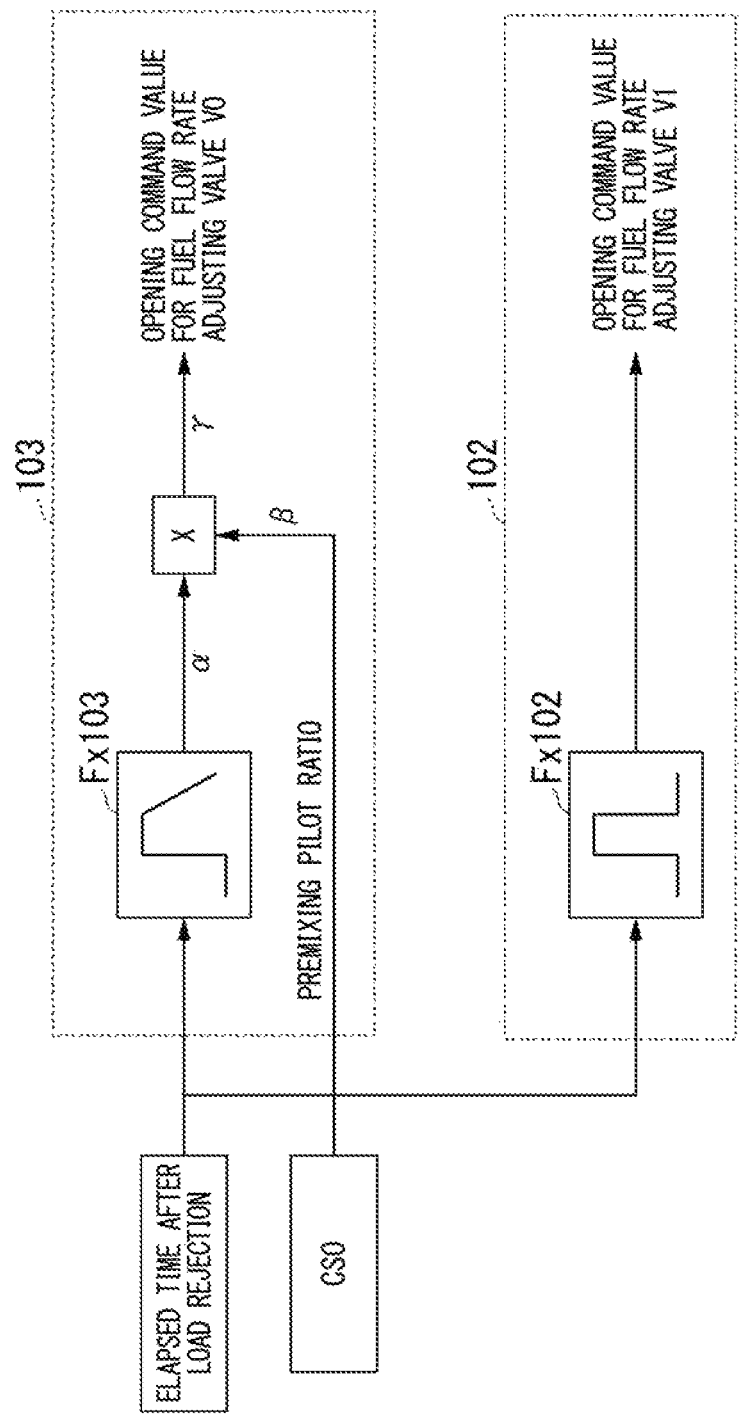
FIG. 6 is a diagram illustrating a method of controlling fuel which is supplied to a premixing pilot system according to the first embodiment of the invention.

FIG. 6 is a diagram illustrating a method of controlling fuel which is supplied to the premixing pilot system according to the first embodiment of the invention.

The timer 104 measures an elapsed time after load rejection and outputs the measured elapsed time to the fuel control unit 102 and the premixing bypass valve control unit 103. The fuel control unit 102 calculates the CSO on the basis of a target load or the like after load rejection.

The fuel control unit 102 has, for example, a function Fx102 for determining the opening of the fuel flow rate adjusting valve V1 based on the elapsed time after load rejection and calculates the opening of the fuel flow rate adjusting valve V1 on the basis of the elapsed time after load rejection acquired from the timer 104 and the function Fx102. The fuel control unit 102 outputs a valve opening command value corresponding to the calculated opening of the fuel flow rate adjusting valve V1. For example, the function Fx102 outputs an opening indicating that the fuel flow rate adjusting valve V1 is fully open for a predetermined value (for example, 0.5 seconds) between 0 seconds and 1 second after load rejection and then is fully closed. The fuel flow rate adjusting valve V1 is fully opened for a predetermined time after load rejection to compensate for a delay until the fuel flow rate adjusting valve V0 is opened and a necessary fuel flow rate is realized because it is necessary to supply a sufficient amount of fuel to the fuel nozzle N1 of the premixing pilot system F1 to stabilize flames of the combustor 13. The fuel control unit 102 fully opens the fuel flow rate adjusting valve V1 such that an amount of fuel supplied from the fuel nozzle N1 at the time of load rejection can be secured.

The premixing bypass valve control unit 103 has, for example, a function Fx103 for calculating a change index indicating a change of a necessary amount of supplied fuel based on the elapsed time after load rejection, and calculates a change index $\alpha$ of the fuel flow rate corresponding to the elapsed time on the basis of the elapsed time after load rejection acquired from the timer 104 and the function Fx103. The premixing bypass valve control unit 103 calculates a fuel flow rate command value $\beta$ by multiplying the CSO indicating a total fuel flow rate required after load rejection and calculated by the fuel control unit 102 by a premixing pilot ratio.

Here, the premixing pilot ratio is a value indicating what proportion of the total fuel flow rate after load rejection is to be assigned to the premixing pilot system F1. Similarly, a main ratio indicating what proportion of the total fuel flow rate after load rejection is to be assigned to the main A system F3 is determined. These values are determined on the basis of the fuel-air ratio criterion illustrated in FIG. 4.

The premixing bypass valve control unit 103 calculates a fuel flow rate command value $\gamma$ corresponding to an amount of fuel supplied via the fuel flow rate adjusting valve V0 according to the elapsed time after load rejection by multiplying the change index $\alpha$ indicating a change over time of the fuel flow rate by the fuel flow rate command value $\beta$. The premixing bypass valve control unit 103 outputs a valve opening command value corresponding to the calculated fuel flow rate command value $\gamma$.

The fuel control unit 102 calculates an amount of fuel supplied from the main A system F3 after load rejection on the basis of the elapsed time after load rejection, the function Fx103, the CSO, and the main ratio.

In this way, the premixing pilot fuel-air ratio and the main A fuel-air ratio when the calculated amount of fuel supplied from the premixing pilot system F1 and the calculated amount of fuel supplied from the main A system F3 are realized are designed to satisfy the fuel-air ratio criterion illustrated in FIG. 4.

Figure 7:
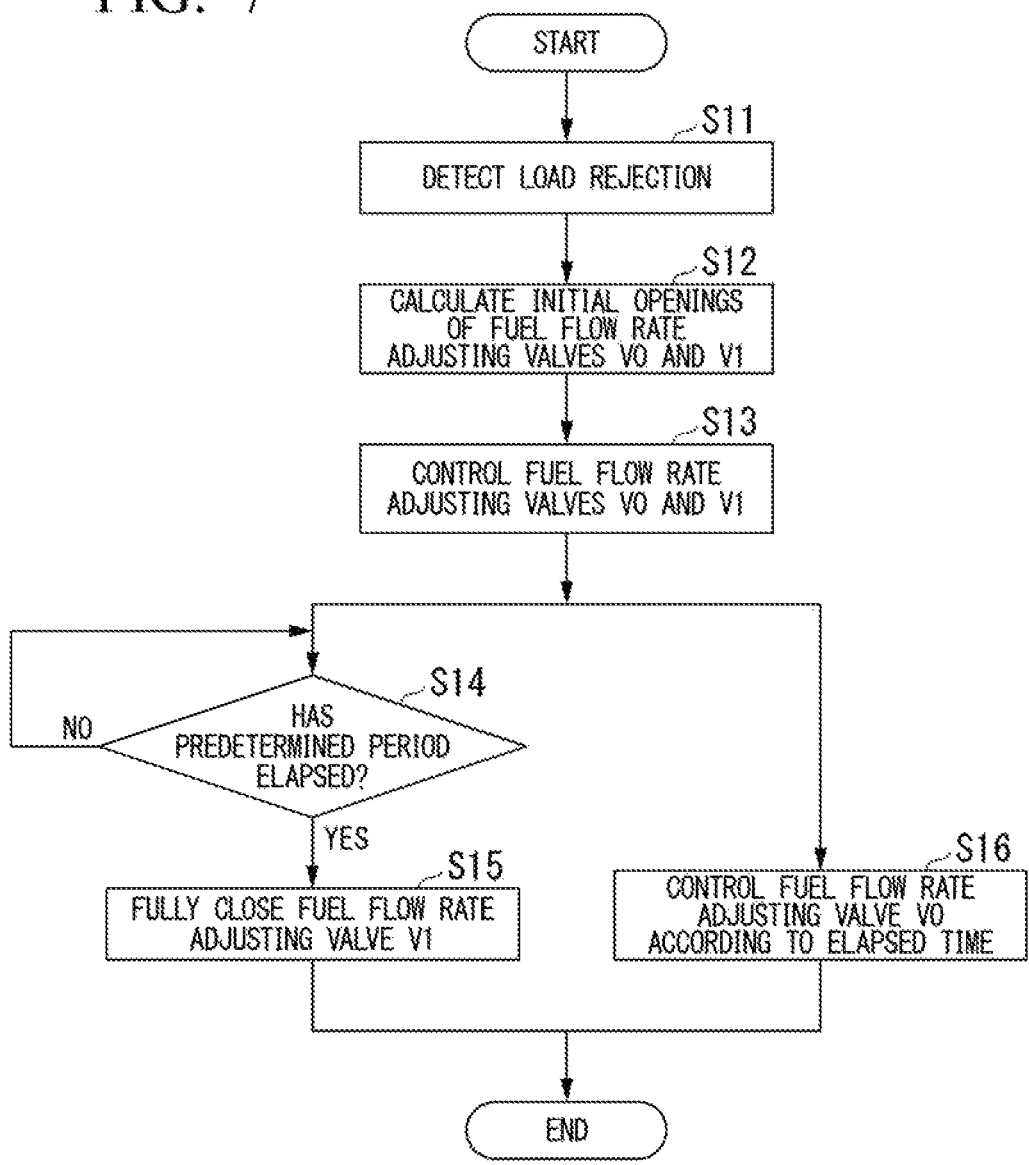
FIG. 7 is a flowchart illustrating an example of control according to the first embodiment of the invention.

FIG. 7 is a flowchart illustrating an example of control in the first embodiment of the invention.

A flow of fuel supply control for the premixing pilot system F1 at the time of load rejection according to this embodiment will be described below with reference to the flowchart illustrated in FIG. 7.

First, at the time of a normal load operation, the fuel control unit 102 closes the fuel flow rate adjusting valve V0 and the fuel flow rate adjusting valve V2 (a diffusing pilot) and controls the fuel flow rate adjusting valves V1 (a premixing pilot), V3 (a main A), V4 (a main B), and V5 (a top hat) to desired openings on the basis of the CSO and distribution proportions of fuel to the fuel systems (for example, time before TO in FIG. 3). Here, it is assumed that load rejection occurs in the power generation plant 1. Then, the load rejection detecting unit 101 acquires a load rejection signal and detects load rejection (Step S11). The load rejection detecting unit 101 notifies the fuel control unit 102 and the premixing bypass valve control unit 103 of occurrence of load rejection and instructs them to perform load rejection fuel supply control. Then, the fuel control unit 102 calculates an initial opening after load rejection of the fuel flow rate adjusting valve V1. The premixing bypass valve control unit 103 calculates an initial opening after load rejection of the fuel flow rate adjusting valve V0 (Step S12). For example, the fuel control unit 102 calculates the opening of the fuel flow rate adjusting valve V1 to be 100%. The premixing bypass valve control unit 103 calculates the opening of the fuel flow rate adjusting valve V0 on the basis of the CSO, a distribution proportion to the premixing pilot system F1, the function Fx102, and the elapsed time as described above with reference to FIG. 6.

Then, the fuel control unit 102 outputs the valve opening command value (the initial opening) calculated in Step S12 to the fuel flow rate adjusting valve V1. The premixing bypass valve control unit 103 outputs the calculated valve opening command value (the initial opening) to the fuel flow rate adjusting valve V0 (Step S13). Accordingly, fuel of a desired flow rate with a relatively high density is supplied via the fuel flow rate adjusting valve V0. There is a delay until the fuel flow rate adjusting valve V0 is opened at a predetermined opening from a fully closed state and fuel is supplied therethrough, and supply of fuel to the premixing pilot system F1 in the meantime is complemented by fully opening the fuel flow rate adjusting valve V1. It is possible to prevent a misfire of the premixing pilot system F1 through such control.

Regarding the fuel systems other than the premixing pilot system F1, the fuel control unit 102 opens the fuel flow rate adjusting valve V3 to an opening based on a value obtained by multiplying the CSO by the distribution proportion to the main A system F3, and controls the openings of the fuel flow rate adjusting valves V2, V4, and V5 to 0%.

Thereafter, the fuel control unit 102 waits for a predetermined time (for example, 0.5 seconds) from the load rejection on the basis of the time measured by the timer 104 (Step S14) and then fully closes the fuel flow rate adjusting valve V1 (Step S15).

On the other hand, the premixing bypass valve control unit 103 controls the opening of the fuel flow rate adjusting valve V0 such that the fuel-air ratio of fuel which is sprayed from the premixing pilot system F1 becomes equal to or greater than the fuel-air ratio criterion at which occurrence of a misfire can be avoided on the basis of the elapsed time after load rejection measured by the timer 104 (Step S16). The method of calculating the opening of the fuel flow rate adjusting valve V0 is the same as described above with reference to FIG. 6. The premixing bypass valve control unit 103 continues to perform the control of Step S16, for example, until a predetermined time elapses after load rejection.

Similarly, the fuel control unit 102 adjusts the opening of the fuel flow rate adjusting valve V3 such that the relationship between the fuel-air ratio of fuel sprayed from the main A system F3 and the fuel-air ratio of fuel sprayed from the premixing pilot system F1 becomes a relationship in which occurrence of a misfire can be avoided. The fuel control unit 102 continues to control the opening of the fuel flow rate adjusting valve V3, for example, until a predetermined time elapses after load rejection.

Figure 8:
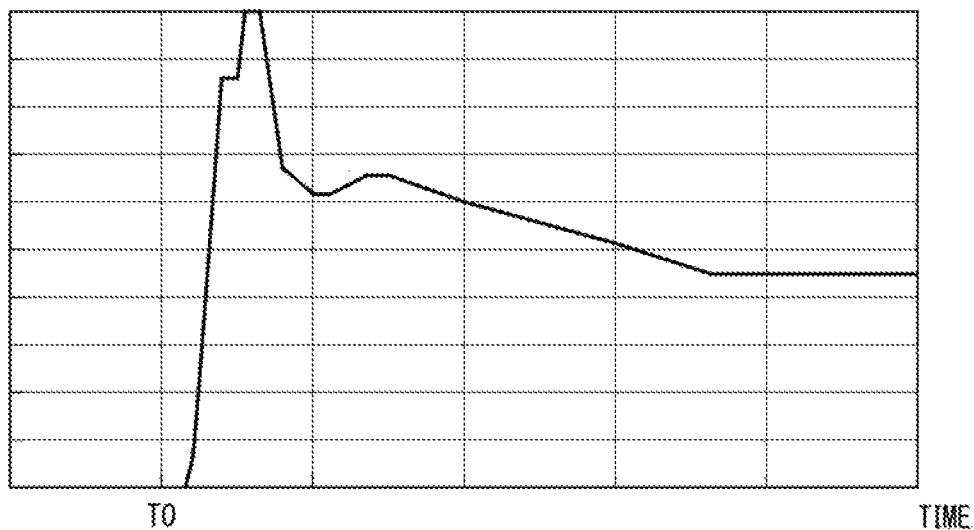
FIG. 8 is a first diagram illustrating an example of control of an opening of a fuel regulating valve according to the first embodiment of the invention.

FIG. 8 is a first diagram illustrating an example of opening control of a fuel regulating valve according to the first embodiment of the invention. Change of the opening of the fuel flow rate adjusting valve V0 corresponding to the processes of Steps S12, S13 and S16 is illustrated in FIG. 8. When load rejection occurs at time TO, the opening of the fuel flow rate adjusting valve V0 is controlled as described above with reference to FIG. 6 to prevent a misfire due to a rapid decrease in an amount of supplied fuel. Since fuel with a high density is supplied from the fuel flow rate adjusting valve V0 with a small pressure loss, a larger amount of fuel can be supplied via the fuel flow rate adjusting valve V0 than the amount of fuel supplied after being heated via the fuel flow rate adjusting valve V1. Since fuel needs to be supplied to the fuel nozzle N1 as early as possible after load rejection, the fuel flow rate adjusting valve V0 is preferably provided at a position close to the premixing pilot manifold PP as described above with reference to FIG. 1.

Figure 9:
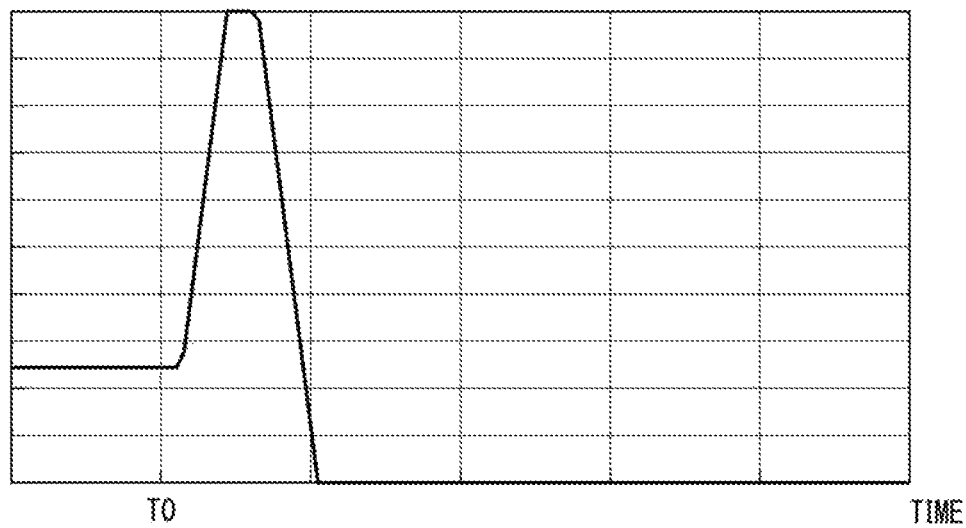
FIG. 9 is a second diagram illustrating an example of control of an opening of a fuel regulating valve according to the first embodiment of the invention.

FIG. 9 is a second diagram illustrating an example of control of the opening of the fuel regulating valve according to the first embodiment of the invention. Change of the opening of the fuel flow rate adjusting valve V1 corresponding to the processes of Steps S12 to S15 is illustrated in FIG. 9. As described above, until supply of fuel via the fuel flow rate adjusting valve V0 is stabilized, the fuel flow rate adjusting valve V1 is fully open to complement the fuel flow rate supplied from the premixing pilot system F1.

Figure 10:
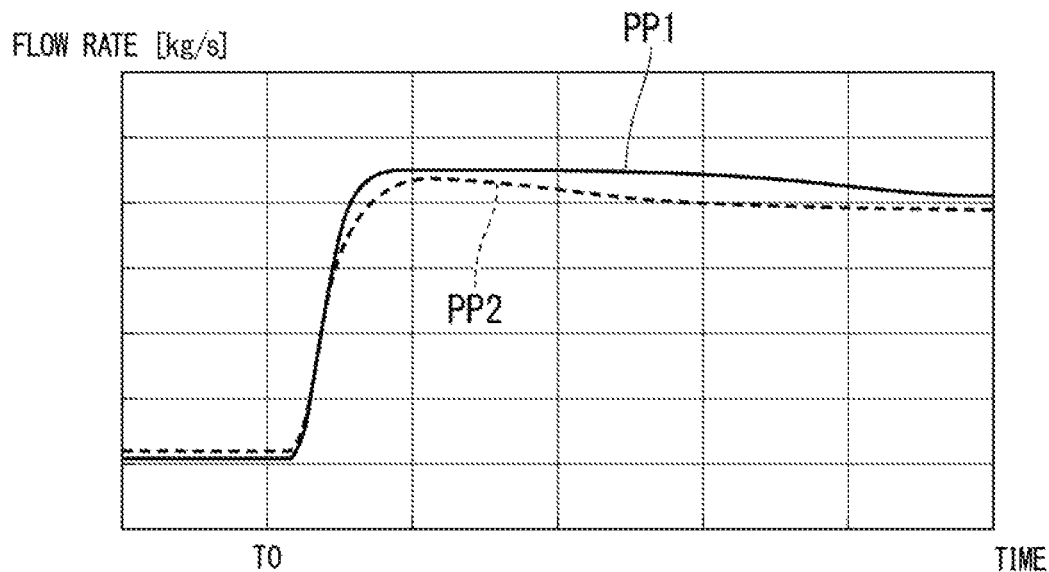
FIG. 10 is a diagram illustrating advantageous effects of control according to the first embodiment of the invention.

FIG. 10 is a diagram illustrating advantageous effects of the control according to the first embodiment of the invention.

Change of the fuel flow rate which is supplied from the premixing pilot system F1 before and after application of the control according to this embodiment is illustrated in FIG. 10.

In graphs illustrated in FIG. 10, the vertical axis represents a fuel flow rate and the horizontal axis represents time. A graph PP1 represents a fuel flow rate when supply of fuel to the premixing pilot system F1 via the fuel line L0 according to this embodiment is added. A graph PP2 represents a fuel flow rate under the control according to the related art in which supply of fuel to the premixing pilot system F1 via the fuel line L0 is not performed. As illustrated in FIG. 10, after load rejection has occurred at time TO, it can be seen that the fuel flow rate represented by the graph PP1 according to this embodiment is greater than the fuel flow rate represented by the graph PP2 under the control according to the related art.

With the fuel line L0 according to this embodiment, (1) fuel of a low temperature before that has been heated can be supplied to the premixing pilot system F1 (2) with a decreased pressure loss. That is, (1) fuel with a high density can be input (2) with a high supply pressure via the fuel line L0. Accordingly, a larger amount of fuel can be supplied via the fuel line L0 than that via the fuel line L1. Accordingly, with the control method according to this embodiment, by adding supply of fuel to the premixing pilot system F1 via the fuel line L0 immediately after load rejection, it is possible to prevent a decrease in fuel flow rate after load rejection and to secure a necessary amount of fuel. It is also possible to stabilize flames of the premixing pilot system F1 serving as pilot flames and to prevent a misfire. Accordingly, for example, even when the fuel supply pressure of the pressure supply system 17 is low, it is possible to curb a misfire at the time of load rejection and to successfully perform operation after load rejection.

Second Embodiment

A control method at the time of load rejection according to a second embodiment of the invention will be described below with reference to FIGS. 11 to 12.

Figure 11:
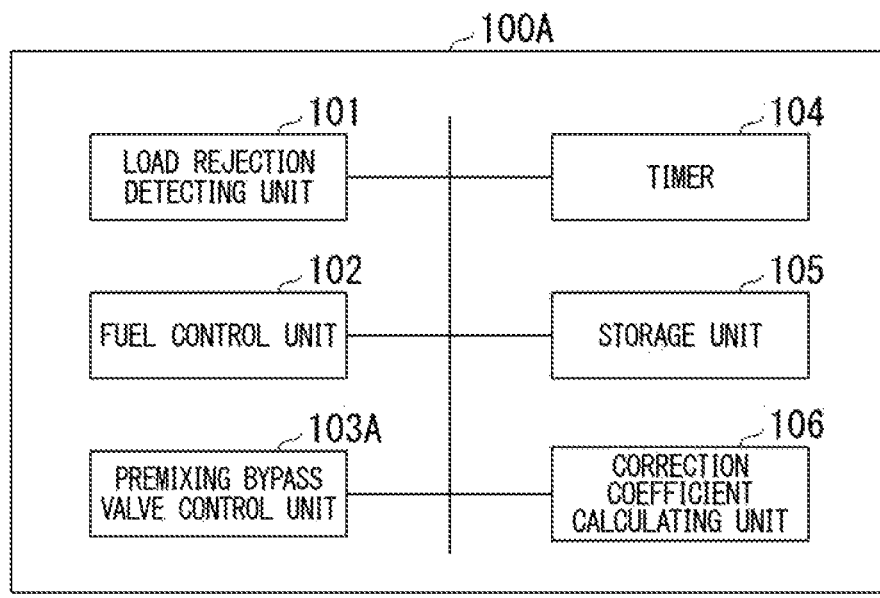
FIG. 11 is a block diagram illustrating an example of a control device according to a second embodiment of the invention.

FIG. 11 is a block diagram illustrating an example of a control device according to the second embodiment of the invention.

The same constituents in the second embodiment of the invention as those in the power generation plant 1 according to the first embodiment will be referred to by the same reference signs and description thereof will be omitted. A control device 100A according to the second embodiment includes a correction coefficient calculating unit 106 in addition to the configuration according to the first embodiment. The control device 100A includes a premixing bypass valve control unit 103A instead of the premixing bypass valve control unit 103.

The correction coefficient calculating unit 106 calculates a correction coefficient for correcting the opening of the fuel flow rate adjusting valve V0 which is calculated by the premixing bypass valve control unit 103A on the basis of environmental conditions indicating states of air suctioned into the gas turbine such as an atmospheric temperature, an atmospheric pressure, and a relative humidity. The correction coefficient calculating unit 106 corrects the opening of the fuel flow rate adjusting valve V0 on the basis of fuel conditions indicating features of fuel such as fuel calories and a fuel density. The premixing bypass valve control unit 103A calculates the corrected opening by multiplying the opening of the fuel flow rate adjusting valve V0 which is calculated by the method according to the first embodiment by the correction coefficient. The correction coefficient calculating unit 106 includes tables in which the correction coefficient is defined depending on the environmental conditions or the fuel conditions (for example, Fx1061 to Fx1064 which will be described later).

Figure 12:
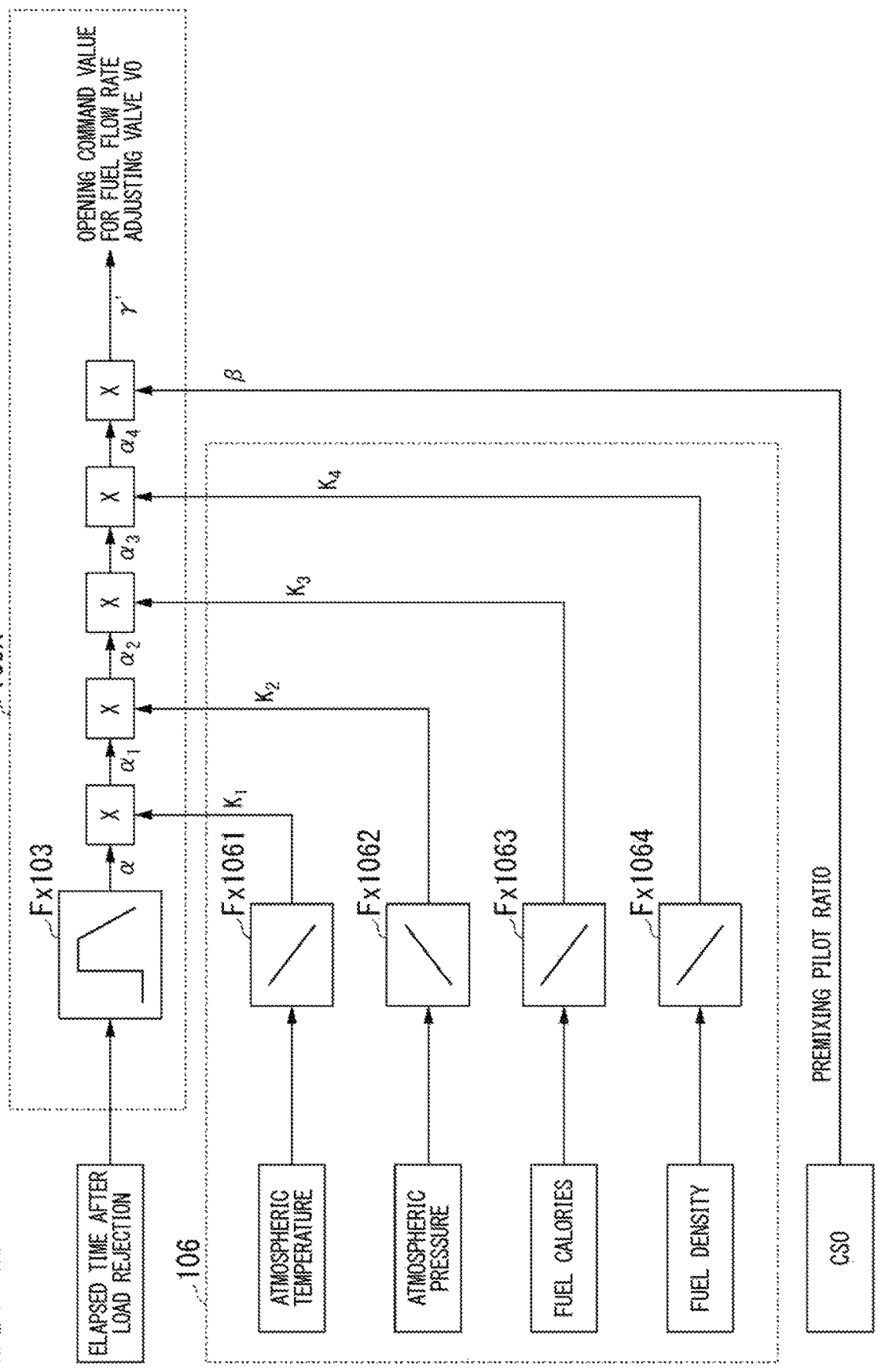
FIG. 12 is a diagram illustrating a method of controlling fuel which is supplied to a premixing pilot system according to the second embodiment of the invention.

FIG. 12 is a diagram illustrating a method of controlling fuel which is supplied to the premixing pilot system according to the first embodiment of the invention.

First, calculation of the correction coefficient based on the atmospheric temperature having a particularly great influence out of the environmental conditions will be described below. A mass flow rate of air which flows into the compressor 11 changes depending on the atmospheric temperature. For example, when the atmospheric temperature increases, the density of air decreases and the mass flow rate of air which flows into the compressor 11 decreases. Even when air with the same volume as the decreased mass flow rate of air flows in, an amount of air which is supplied to the combustor 13 decreases and the fuel-air ratio and the flame temperature are affected. On the other hand, when the atmospheric temperature decreases, the density of air increases and the mass flow rate of air which is sucked into the compressor 11 increases. When the mass flow rate of air increases, the fuel-air ratio (Fuel/Air) decreases and the flame temperature decreases. Therefore, in order to compensate for this, the valve opening of the fuel flow rate adjusting valve V0 is corrected on the basis of the atmospheric temperature to realize an appropriate fuel-air ratio in this embodiment.

For example, the correction coefficient calculating unit 106 acquires the atmospheric temperature in the vicinity of the air inlet system 18 from a temperature sensor (not illustrated) which is provided on an inlet side of the compressor 11. The correction coefficient calculating unit 106 calculates a correction coefficient $K_1$ of the valve opening corresponding to the atmospheric temperature acquired from the correction coefficient table Fx1061. The horizontal axis of the correction coefficient table Fx1061 represents the atmospheric temperature and the vertical axis thereof represents the correction coefficient of the valve opening. When the atmospheric temperature is high, the density of air flowing into the compressor 11 decreases and thus it is also necessary to decrease a fuel flow rate therewith. Accordingly, in the correction coefficient table Fx1061, the correction coefficient $K_1$ is set to be less as the atmospheric temperature increases. The correction coefficient calculating unit 106 outputs the correction coefficient $K_1$ corresponding to the atmospheric temperature to the premixing bypass valve control unit 103A.

The premixing bypass valve control unit 103A acquires the elapsed time after load rejection from the timer 104 and calculates the change index α over time of the fuel flow rate based on the elapsed time after load rejection using the function Fx103. The premixing bypass valve control unit 103A calculates the change index $α_1$ by multiplying the change index α by the correction coefficient $K_1$.

Similarly, the correction coefficient calculating unit 106 may calculate the correction coefficient based on the atmospheric pressure, the fuel density, and the fuel calorie. For example, regarding the atmospheric pressure, the correction coefficient (the vertical axis) is set to have a positive correlation with the atmospheric pressure (the horizontal axis) as represented in the correction coefficient table Fx1062. The correction coefficient calculating unit 106 calculates a correction coefficient $K_2$ of the valve opening corresponding to the atmospheric pressure from the correction coefficient table Fx1062. The correction coefficient calculating unit 106 outputs the correction coefficient $K_2$ to the premixing bypass valve control unit 103A. The premixing bypass valve control unit 103A calculates the change index $α_2$ by multiplying the change index $α_1$ by the correction coefficient $K_2$.

Regarding the fuel calorie, as represented in the correction coefficient table Fx1063, the correction coefficient (the vertical axis) is set to have a negative correlation with the fuel calories (the horizontal axis). The correction coefficient calculating unit 106 calculates the correction coefficient $K_3$ of the valve opening corresponding to the fuel calories from the correction coefficient table Fx1063. The premixing bypass valve control unit 103A calculates the change index $α_3$ by multiplying the change index $α_2$ by the correction coefficient $K_3$.

Regarding the fuel density, as represented in the correction coefficient table Fx1064, the correction coefficient (the vertical axis) is set to have a negative correlation with the fuel density (the horizontal axis). The correction coefficient calculating unit 106 calculates the correction coefficient $K_4$ of the valve opening corresponding to the fuel density from the correction coefficient table Fx1064. The premixing bypass valve control unit 103A calculates the change index $α_4$ by multiplying the change index $α_3$ by the correction coefficient $K_4$.

The premixing bypass valve control unit 103A calculates a fuel flow rate command value γ' according to the elapsed time after load rejection by multiplying the change index $α_4$ by the fuel flow rate command value β. The premixing bypass valve control unit 103A outputs a valve opening command value for the fuel flow rate adjusting valve V0 corresponding to the calculated fuel flow rate command value γ'.

In FIG. 12, examples in which the correction coefficient for the fuel flow rate adjusting valve V0 is calculated on the basis of the four parameters are illustrated, but the invention is not limited thereto. For example, the correction coefficient calculating unit 106 may calculate the correction coefficient based on additional atmospheric humidity. The invention is not limited to the embodiment in which the correction coefficient is calculated on the basis of all the parameters, but the correction coefficient calculating unit 106 may be configured to calculate the correction coefficient based on one or more arbitrary parameters within the atmospheric temperature, the atmospheric pressure, the atmospheric humidity, the fuel density, and the fuel calorie, and the premixing bypass valve control unit 103A may be configured to calculate the valve opening command value of the fuel flow rate adjusting valve V0 by multiplying the correction coefficient by the change index a. The fuel control unit 102 may calculate the valve opening of the fuel flow rate adjusting valve V3 of the main A system F3 by multiplication by the correction coefficient calculated by the correction coefficient calculating unit 106.

A flow of fuel supply control for the premixing pilot system F1 at the time of load rejection according to the second embodiment will be described below with reference to FIG. 7. In this embodiment, in the processes of Steps S12 and S16, the valve opening command value of the fuel flow rate adjusting valve V0 is corrected on the basis of the atmospheric temperature or the like as described above with reference to FIG. 12. The overall process flow or the processes of other steps are the same as in the first embodiment.

According to this embodiment, it is possible to calculate the valve opening of the fuel flow rate adjusting valve V0 based on the atmospheric temperature, the atmospheric pressure, the fuel calorie, and the like. Accordingly, it is possible to appropriately cope with various environmental conditions or fuel conditions at the time of load rejection and to more satisfactorily prevent a misfire.

Third Embodiment

A gas turbine combustion control device according to a third embodiment of the invention will be described below with reference to FIGS. 13 to 15. The third embodiment can be combined with any of the first embodiment and the second embodiment, and a combination thereof with the first embodiment will be exemplified below.

Figure 13:
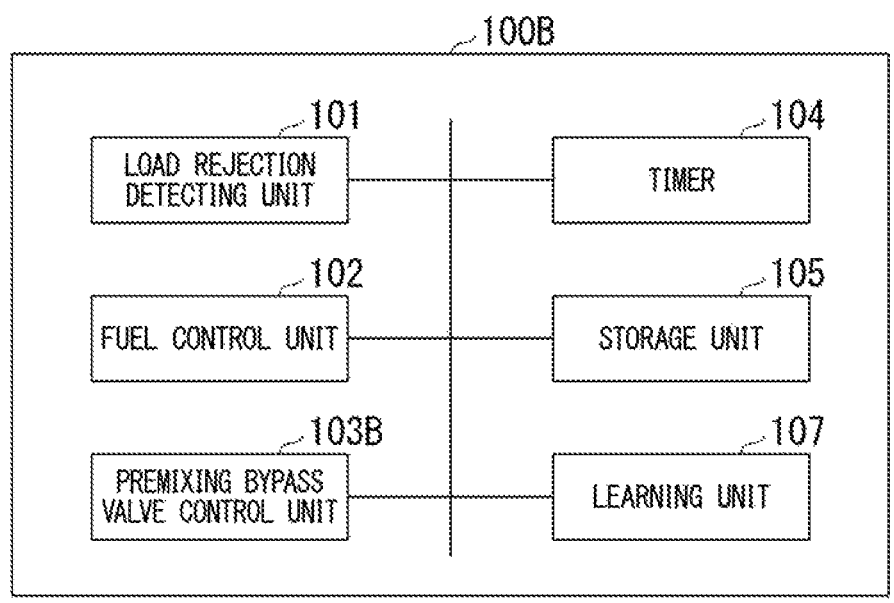
FIG. 13 is a block diagram illustrating an example of a control device according to a third embodiment of the invention.

FIG. 13 is a block diagram illustrating an example of the control device according to the third embodiment of the invention. The same constituents according to the third embodiment of the invention as the constituents of the power generation plant 1 according to the first embodiment and the second embodiment will be referred to by the same reference signs and description thereof will be omitted. The control device 100B according to the third embodiment includes a learning unit 107 in addition to the configuration according to the first embodiment. The control device 100B includes a premixing bypass valve control unit 103B instead of the premixing bypass valve control unit 103.

The learning unit 107 has a function of adjusting the valve opening of the fuel flow rate adjusting valve V0 calculated by the premixing bypass valve control unit 103B to correspond to an actual operation of the gas turbine 10. For example, the learning unit 107 learns an adjustment coefficient k(t) on the basis of the relationship between the actual premixing pilot fuel-air ratio and the main A fuel-air ratio and a difference from the fuel-air ratio criterion illustrated in FIG. 4 when load rejection occurs (a learning function 107b). The learning unit 107 outputs the adjustment coefficient k(t) learned when load rejection occurs in the next time to the premixing bypass valve control unit 103B (an adjustment function 107a).

The premixing bypass valve control unit 103B calculates an adjusted valve opening by multiplying the valve opening calculated using the method according to the first embodiment by the adjustment coefficient k(t).

Figure 14:
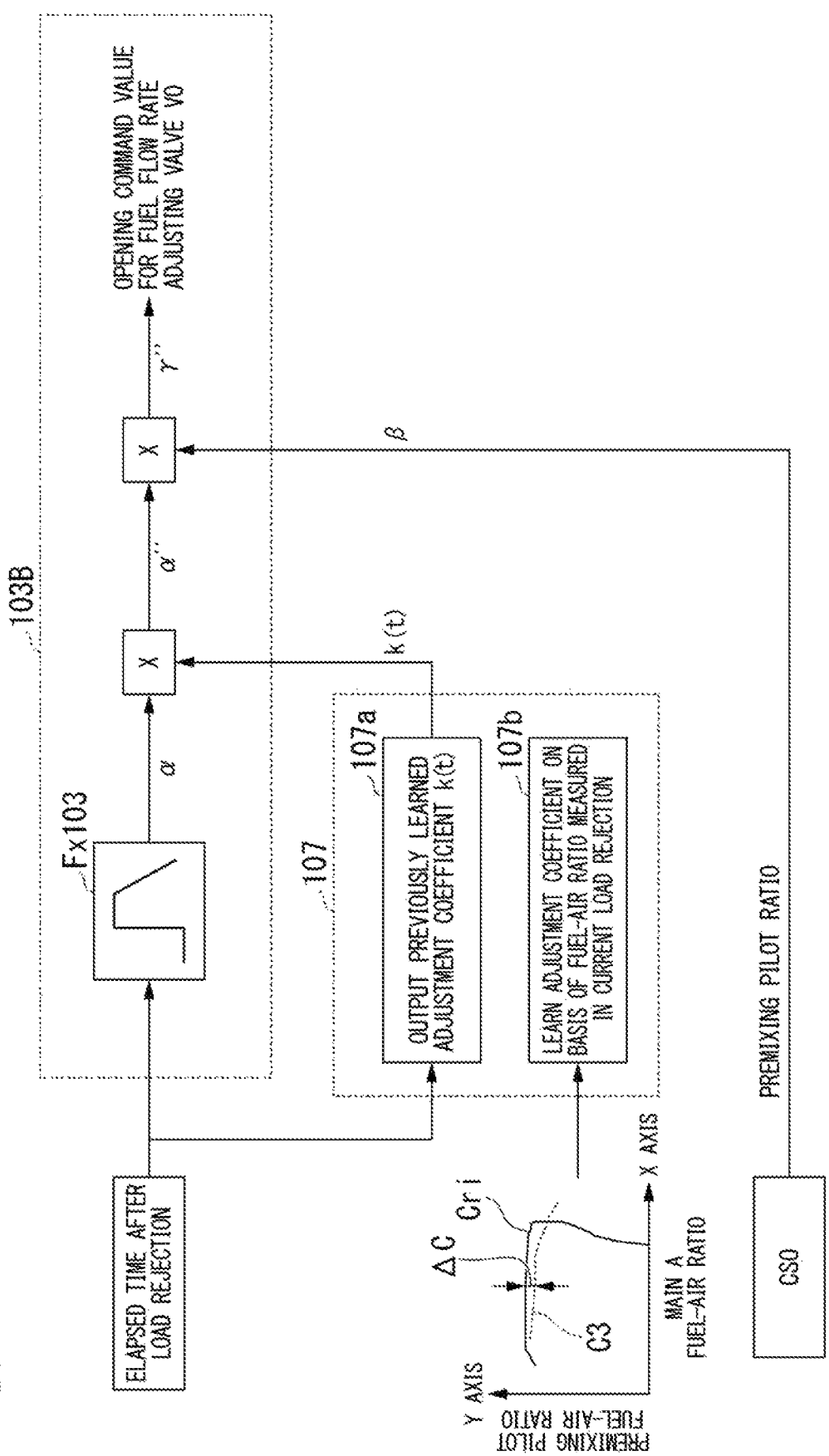
FIG. 14 is a diagram illustrating a method of controlling fuel which is supplied to a premixing pilot system according to the third embodiment of the invention.

FIG. 14 is a diagram illustrating a method of controlling fuel which is supplied to the premixing pilot system according to the third embodiment of the invention.

(Learning Function)

The learning function 107b of the learning unit 107 will be described below. The learning unit 107 calculates the premixing pilot fuel-air ratio and the main A fuel-air ratio whenever load rejection occurs. For example, the learning unit 107 calculates a fuel flow rate to the fuel nozzle N1 from measured values of a pressure sensor upstream and a pressure sensor downstream with respect to the fuel nozzle N1 to the fuel nozzle N1. For example, the learning unit 107 calculates an air flow rate to the fuel nozzle N1 on the basis of the opening of the IGV 15, the atmospheric temperature, the atmospheric pressure, and the like. The learning unit 107 calculates the fuel-air ratio corresponding to the fuel nozzle N1 (the premixing pilot fuel-air ratio) by dividing the fuel flow rate to the fuel nozzle N1 by the air flow rate to the fuel nozzle N1.

Similarly, the learning unit 107 calculates a fuel flow rate to the fuel nozzle N3 from measured values of the pressure sensors upstream and downstream with respect to the fuel nozzle N3, and calculates an air flow rate to the fuel nozzle N3 on the basis of the opening of the IGV 15 or the like. The learning unit 107 calculates the fuel-air ratio corresponding to the fuel nozzle N3 (the main A fuel-air ratio) by dividing the fuel flow rate to the fuel nozzle N3 by the air flow rate to the fuel nozzle N3. The learning unit 107 records the relationship between the actual main A fuel-air ratio and the premixing pilot fuel-air ratio in the storage unit 105 (a graph C3 in FIG. 14).

Then, the learning unit 107 compares the graph C3 with a fuel-air ratio criterion Cri which is prepared in advance, and calculates a difference therebetween when the premixing pilot fuel-air ratio does not reach the fuel-air ratio criterion Cri. The learning unit 107 calculates the difference ΔC every elapsed time after load rejection and records the calculated difference ΔC in the storage unit 105 in correlation with the elapsed time.

The learning unit 107 learns the adjustment coefficient at each time, for example, using Expression (1).

$$k(t)\text{new} = k(t)\text{now} + K \times (\text{actual premixing pilot fuel-air ratio}(t) - \text{target premixing pilot fuel-air ratio}(t)) \quad (1)$$

Here, t denotes the elapsed time after load rejection, k(t)new denotes a new adjustment coefficient at the elapsed time t after learning, k(t)now denotes a newest adjustment coefficient at the elapsed time t before learning, K denotes a predetermined constant for defining an effect of learning, the actual premixing pilot fuel-air ratio(t) denotes the premixing pilot fuel-air ratio which is calculated through the above routine at time t, and the target premixing pilot fuel-air ratio(t) denotes a value of the premixing pilot fuel-air ratio of the fuel-air ratio criterion Cri corresponding to the actual premixing pilot fuel-air ratio(t) and the actual main A fuel-air ratio(t) (a value on the Y axis of the graph Cri at a position having the same value on the X axis as the actual main A fuel-air ratio(t)).

In this way, by learning the adjustment coefficient k(t), it is possible to obtain the adjustment coefficient for maintaining the premixing pilot fuel-air ratio which reaches the fuel-air ratio criterion. When load rejection occurs, the learning unit 107 updates the value of k(t).

(Adjustment Function)

The adjustment function 107a of the learning unit 107 will be described below. When load rejection occurs in the next time, the learning unit 107 reads and obtains the newest adjustment coefficient k(t) acquired as the result of learning on the basis of the elapsed time measured by the timer 104 with reference to the storage unit 105. The adjustment coefficient k(t) acquired by the learning unit 107 is output to the premixing bypass valve control unit 103B.

The premixing bypass valve control unit 103B acquires the elapsed time after load rejection and calculates the change index α of the fuel flow rate based on the elapsed time after load rejection using the function Fx103. The premixing bypass valve control unit 103B calculates a change index α" by multiplying the change index α by the adjustment coefficient k(t) every elapsed time. The premixing bypass valve control unit 103B calculates a fuel flow rate command value γ" according to the elapsed time after load rejection by multiplying the change index α" by the fuel flow rate command value β. The premixing bypass valve control unit 103B outputs the valve opening command value for the fuel flow rate adjusting valve V0 corresponding to the calculated fuel flow rate command value γ".

The premixing bypass valve control unit 103B can correct the valve opening command value for the fuel flow rate adjusting valve V0 depending on the environmental conditions or the fuel conditions by additional multiplication by the correction coefficient based on the atmospheric temperature, the atmospheric pressure, the atmospheric humidity, the fuel density, and the fuel calories calculated by the correction coefficient calculating unit 106 according to the second embodiment.

A flow of fuel supply control of the premixing pilot system F1 at the time of load rejection according to the third embodiment will be described below with reference to FIG. 7. In this embodiment, in the processes of Steps S12 and S16, the valve opening command value of the fuel flow rate adjusting valve V0 based on the adjustment coefficient is corrected as described above with reference to FIG. 14. The overall process flow or the processes of other steps are the same as in the first embodiment. A process flow of the learning function 107b will be described below.

Figure 15:
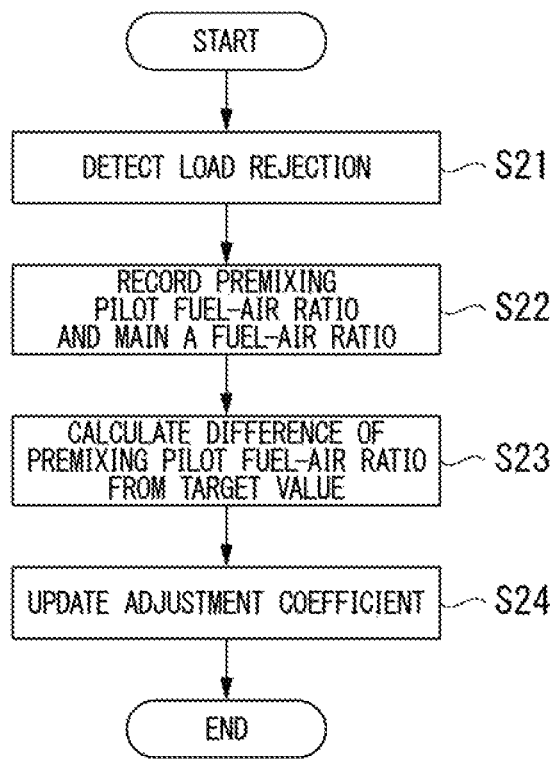
FIG. 15 is a flowchart illustrating an example of a process of learning a valve opening adjustment coefficient according to the third embodiment of the invention.

FIG. 15 is a flowchart illustrating an example of a process of learning a valve opening adjustment coefficient according to the third embodiment of the invention.

First, it is assumed that load rejection occurs in the power generation plant 1. Then, the load rejection detecting unit 101 detects load rejection (Step S21). Then, the premixing bypass valve control unit 103B starts control of the fuel flow rate adjusting valve V0 described above with reference to FIG. 6. Then, the learning unit 107 calculates the premixing pilot fuel-air ratio and the main A fuel-air ratio every predetermined time and records the calculated fuel-air ratios in the storage unit 105 (Step S22). The process of Step S22 is performed in parallel with the processes of Steps S12 and S16. The processes of subsequent steps are performed in parallel with the processes of Steps S12 and S16 or after operation at the time of load rejection.

Then, the learning unit 107 calculates a difference ΔC between a target value of the premixing pilot ratio indicated by the fuel-air ratio criterion recorded in the storage unit 105 and the premixing pilot ratio every elapsed time after load rejection recorded in Step S22 (Step S23). Then, the learning unit 107 updates the adjustment coefficient k(t) using Expression (1) (Step S24).

In Expression (1), the difference ΔC between the actual premixing pilot fuel-air ratio and the target premixing pilot fuel-air ratio may be a difference between a calculated value of the actual premixing pilot flame temperature and a calculated value of the target premixing pilot flame temperature. Alternatively, the difference may be a difference between the actual premixing pilot fuel-air ratio and the value based on the actual temperature of the compartment 12 (for example, an output value of a function with the premixing pilot fuel-air ratio and the temperature of the compartment 12 as input values) and a target value thereof.

According to this embodiment, whenever load rejection occurs, it is possible to learn the adjustment coefficient for realizing the more optimal valve opening of the fuel flow rate adjusting valve V0 and to decrease a likelihood of a misfire. For example, by learning the adjustment coefficient in which plant characteristics such as a change over time, operating environments, and load conditions of the power generation plant 1 are reflected, it is possible to more appropriately control operation after load rejection while avoiding a misfire.

In the first to third embodiments, supply of fuel to the premixing pilot system F1 via the fuel line L0 and the fuel line L1 is performed at the time of load rejection, but applicability of the embodiments is not limited to load rejection. For example, in an operation of rapidly decreasing a load every embodiments can be used in combination with control for decreasing an amount of supplied fuel. The rapid decrease in load is, for example, a case in which a load decrease rate of the gas turbine 10 is higher than 100%.

Figure 16:
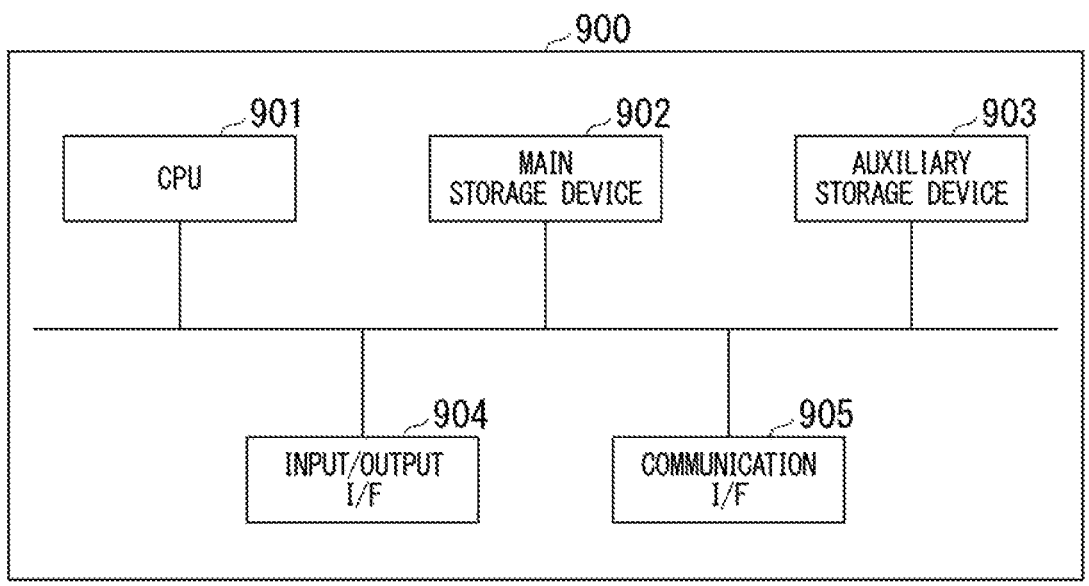
FIG. 16 is a diagram illustrating an example of a hardware configuration of a control device according to the embodiments of the invention.

FIG. 16 is a diagram illustrating an example of a hardware configuration of the control device according to the embodiments of the invention.

A computer 900 is, for example, a personal computer (PC) or a server terminal including a CPU 901, a main storage device 902, an auxiliary storage device 903, an input/output interface 904, and a communication interface 905. The above-mentioned control devices 100, 100A, and 100B are mounted in the computer 900. Operations of the processing units described above are stored in the form of a program in the auxiliary storage device 903. The CPU 901 reads the program from the auxiliary storage device 903, loads the program to the main storage device 902, and performs the above-mentioned processes in accordance with the program. The CPU 901 reserves a storage area corresponding to the storage unit 105 in the main storage device 902 in accordance with the program. The CPU 901 reserves a storage area which stores data in processing in the auxiliary storage device 903 in accordance with the program.

In at least one embodiment, the auxiliary storage device 903 is an example of a non-transitory tangible medium. Other examples of the non-transitory tangible medium include a magnetic disk, a magneto-optical disc, a CD-ROM, a DVD-ROM, and a semiconductor memory which are connected thereto via the input/output interface 904. When the program is transmitted to the computer 900 via a communication line, the computer 900 having received the program may load the program to the main storage device 902 and perform the above-mentioned processes. The program may be provided for realizing some of the above-mentioned functions. The program may be a program which can realize the above-mentioned functions in combination with another program which is stored in the auxiliary storage device 903 in advance, that is, a so-called differential file (a differential program).

All or some of the load rejection detecting unit 101, the fuel control unit 102, the premixing bypass valve control units 103, 103A, and 103B, the timer 104, the storage unit 105, the correction coefficient calculating unit 106, and the learning unit 107 may be realized in hardware such as a large scale integration (LSI), an application-specific integrated circuit (ASIC), a programmable logic device (PLD), or a field-programmable gate array (FPGA).

The constituents of the above-mentioned embodiments can be appropriately replaced with known constituents without departing from the gist of the invention. The technical scope of the invention is not limited to the above-mentioned embodiments and can be subjected to various modifications without departing from the gist of the invention.

The fuel nozzle N1 is an example of a first nozzle, the fuel nozzle N3 is an example of a second nozzle, the fuel line L1 is an example of a fuel supply flow passage, the fuel line L0 is an example of a bypass flow passage, the fuel flow rate adjusting valve V0 is an example of a bypass fuel flow rate adjusting valve, the fuel flow rate adjusting valve V1 is an example of a first fuel flow rate adjusting valve, and the fuel-air ratio criterion is an example of information indicating a relationship between a fuel-air ratio of the first nozzle and a fuel-air ratio of the second nozzle at which a misfire occurs. The line L3 is an example of a discharge flow passage of drainage. The fuel supply system includes the control device 100, the fuel line L0, the fuel line L1, and the fuel systems F1 to F5.

INDUSTRIAL APPLICABILITY

With the fuel supply system, the gas turbine, the power generation plant, the control method, and the program which are described above, it is possible to secure a necessary amount of supplied fuel and to prevent a misfire even when an amount of supplied fuel is decreased in rapidly decreasing a load of the gas turbine.

REFERENCE SIGNS LIST

1 Gas turbine combined system power plant
100, 100A, 100B Control device
101 Load rejection detecting unit
102 Fuel control unit
103, 103A, 103B Premixing bypass valve control unit
104 Timer
105 Storage unit
106 Correction coefficient calculating unit
107 Learning unit
10 Gas turbine
11 Compressor
12 Compartment
13 Combustor
14 Turbine
15 IGV
16 Rotor
17 Pressure supply system
18 Air inlet system
20 Steam turbine
21 Heat recovery steam generator
22 Turbine
23 Fuel gas heater
40 Power generator
P3 Fuel tank
L0, L1 Fuel line
L3 Line
V6 Shutoff valve
P0 Drain outlet
P1 Drain inlet
P2 Shutoff valve outlet
V7 Pressure regulating valve
V8 Pressure regulating valve
V9 Safety valve
V10 Safety valve
FL0, FL1 Filter
F1 Premixing pilot system
F2 Diffusing pilot system
F3 Main A system
F4 Main B system
F5 Top hat system
PP Premixing pilot manifold
DP Diffusing pilot manifold
MA Main A manifold
MB Main B manifold
THA Top hat manifold
V0, V1, V2, V3, V4, V5 Fuel flow rate adjusting valve
N1, N2, N3, N4, N5 Fuel nozzle
900 Computer
901 CPU
902 Main storage device
903 Auxiliary storage device
904 Input/output interface
905 Communication interface

The invention claimed is:

1. A fuel supply system comprising:
a fuel supply flow passage that includes a fuel gas heater which heats fuel of a gas turbine and supplies the fuel heated by the fuel gas heater to a first nozzle of a pilot system which supplies flames serving as pilot flames and a second nozzle of another fuel system;
a bypass flow passage that connects to the pilot system and supplies the fuel to the first nozzle without passing through the fuel supply flow passage; and
a bypass fuel flow rate adjusting valve that adjusts a flow rate of the fuel flowing in the bypass flow passage.

2. The fuel supply system according to claim 1, wherein a density of the fuel which is supplied to the first nozzle via the bypass flow passage is higher than a density of the fuel which is supplied to the first nozzle via the fuel supply flow passage.

3. The fuel supply system according to claim 1, wherein a pressure loss in the bypass flow passage is less than a pressure loss in the fuel supply flow passage.

4. The fuel supply system according to claim 1, further comprising a discharge flow passage of drainage that connects the bypass flow passage and the fuel supply flow passage.

5. The fuel supply system according to claim 4, wherein the bypass fuel flow rate adjusting valve is provided between a connection position of the discharge flow passage in the bypass flow passage and a manifold to which the first nozzle is connected.

6. The fuel supply system according to claim 5, wherein the bypass fuel flow rate adjusting valve is provided at a position which is closer to the manifold than the connection position of the discharge flow passage.

7. The fuel supply system according to claim 1, wherein, when a piping distance between the bypass fuel flow rate adjusting valve and a manifold to which the first nozzle is connected is defined as a first distance and a piping distance between a first fuel flow rate adjusting valve that is disposed in the fuel supply flow passage and adjusts a flow rate of the fuel supplied to the first nozzle and the manifold is defined as a second distance, the bypass fuel flow rate adjusting valve is provided at a position at which the first distance is equal to or less than the second distance.

8. The fuel supply system according to claim 1, further comprising a control device that adjusts an opening of the bypass fuel flow rate adjusting valve.

9. The fuel supply system according to claim 8, wherein a first fuel flow rate adjusting valve that adjusts a flow rate of the fuel supplied to the first nozzle is provided in the fuel supply flow passage, and wherein the control device opens the first fuel flow rate adjusting valve and the bypass fuel flow rate adjusting valve at a time of a decrease in load with an opening greater than that before the decrease in load of the gas turbine.

10. The fuel supply system according to claim 9, wherein the control device performs control for fully opening the first fuel flow rate adjusting valve for a predetermined time at the time of the decrease in load and opening the bypass fuel flow rate adjusting valve, which is in a closed state before the decrease in load, with a predetermined opening at the time of the decrease in load.

11. The fuel supply system according to claim 10, wherein the control device controls the opening of the bypass fuel flow rate adjusting valve after the decrease in load, on the basis of a change index of a fuel flow rate which is determined according to an elapsed time after the decrease in load.

12. The fuel supply system according to claim 9, wherein the control device learns a coefficient for adjusting the opening of the bypass fuel flow rate adjusting valve on the basis of a fuel-air ratio of the first nozzle and a fuel-air ratio of the second nozzle at the time of the decrease in load and information indicating a relationship between the fuel-air ratio of the first nozzle and the fuel-air ratio of the second nozzle at which a misfire occurs.

13. The fuel supply system according to claim 8, wherein the control device corrects the opening of the bypass fuel flow rate adjusting valve on the basis of an environmental condition indicating a state of air which is suctioned into the gas turbine.

14. The fuel supply system according to claim 8, wherein the control device corrects the opening of the bypass fuel flow rate adjusting valve on the basis of a fuel condition indicating a feature of the fuel.

15. A gas turbine comprising:
a compressor;
a combustor;
a turbine; and
the fuel supply system according to claim 1.

16. A power generation plant comprising:
the gas turbine according to claim 15;
a steam turbine; and
a power generator.

17. A control method for a fuel supply system including: a fuel supply flow passage that includes a fuel gas heater which heats fuel of a gas turbine and supplies the fuel heated by the fuel gas heater to a first nozzle of a pilot system which supplies flames serving as pilot flames and a second nozzle of another fuel system, a bypass flow passage that connects to the pilot system and supplies the fuel to the first nozzle without passing through the fuel supply flow passage, and a bypass fuel flow rate adjusting valve that adjusts a flow rate of the fuel flowing in the bypass flow passage, wherein the bypass fuel flow rate adjusting valve is controlled from a closed state to an open state at the time of a decrease in load of the gas turbine.

* * * * *